US009640084B2

(12) United States Patent
Schweid et al.

(10) Patent No.: US 9,640,084 B2
(45) Date of Patent: May 2, 2017

(54) COMPUTER-BASED SYSTEM AND METHOD FOR CREATING CUSTOMIZED MEDICAL VIDEO INFORMATION USING CROWD SOURCING

(71) Applicant: Xerox Corporation, Norwalk, CT (US)

(72) Inventors: Stuart Schweid, Pittsford, NY (US); Beilei Xu, Penfield, NY (US); Michael P. Kehoe, Rochester, NY (US); Lee Anne Williams, Pittsford, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 712 days.

(21) Appl. No.: 14/035,375

(22) Filed: Sep. 24, 2013

(65) Prior Publication Data

US 2015/0086947 A1    Mar. 26, 2015

(51) Int. Cl.
*G09B 5/06* (2006.01)
*G11B 27/02* (2006.01)
*G11B 27/10* (2006.01)

(52) U.S. Cl.
CPC ............... *G09B 5/06* (2013.01); *G11B 27/02* (2013.01); *G11B 27/102* (2013.01)

(58) Field of Classification Search
CPC .......... G11B 27/02; G11B 27/102; G09B 5/06
USPC .............. 434/219; 705/3; 715/716, 751, 765
See application file for complete search history.

(56) References Cited

U.S. PATENT DOCUMENTS

| 6,171,112 | B1 * | 1/2001 | Clark ................... | G06F 19/327 |
| | | | | 434/321 |
| 6,507,726 | B1 * | 1/2003 | Atkinson ................. | G09B 7/02 |
| | | | | 434/307 R |
| 7,761,816 | B2 * | 7/2010 | Goldfarb ................. | H04M 1/57 |
| | | | | 379/373.01 |
| 7,827,490 | B2 * | 11/2010 | Kapur ................. | G06F 3/04847 |
| | | | | 715/716 |
| 8,060,827 | B2 * | 11/2011 | Fischer ............. | G06F 17/30053 |
| | | | | 386/291 |
| 8,918,819 | B1 * | 12/2014 | Peters ................ | H04N 21/2402 |
| | | | | 725/139 |

(Continued)

OTHER PUBLICATIONS

U.S. Appl. No. 13/462,867 (Unpublished), filed May 3, 2012. Xu et al.

*Primary Examiner* — Robert J Utama
*Assistant Examiner* — Michael Humphrey
(74) *Attorney, Agent, or Firm* — Simpson & Simpson, PLLC (57) ABSTRACT

A computer-based apparatus including a computer including a processor arranged to select a first video regarding a medical condition; create a second video including segments from the first video; transmit the second video for viewing by qualified medical personnel; receive input from the personnel; based on the input confirm accuracy of a first segment or modify a second segment or delete a third segment; create, from the second video, by at least including the first or second segment or deleting the third segment; transmit the third video for viewing by viewers; receive a respective response from each viewer identifying a respective fourth segment of the third video deemed relevant to the medical condition or enjoyable; create a fourth video including at least a portion of the respective fourth segments; and store the fourth video for inclusion in a video regarding the medical condition.

19 Claims, 4 Drawing Sheets

(56) References Cited

U.S. PATENT DOCUMENTS

| | | | |
|---|---|---|---|
| 2003/0093790 A1* | 5/2003 | Logan | G06F 17/30265 725/38 |
| 2004/0125133 A1* | 7/2004 | Pea | G06F 17/30014 715/751 |
| 2005/0188319 A1* | 8/2005 | Shinkai | G11B 27/034 715/751 |
| 2005/0210393 A1* | 9/2005 | Maeng | G06Q 10/10 715/751 |
| 2006/0064643 A1* | 3/2006 | Hariton | G06F 17/30056 715/751 |
| 2006/0294467 A1* | 12/2006 | Auterinen | G06F 17/30056 715/723 |
| 2007/0239839 A1* | 10/2007 | Buday | H04L 65/4015 709/208 |
| 2008/0134054 A1* | 6/2008 | Clark | G06F 17/30011 715/753 |
| 2008/0320139 A1* | 12/2008 | Fukuda | G06Q 30/02 709/226 |
| 2009/0196570 A1* | 8/2009 | Dudas | G11B 27/034 386/278 |
| 2010/0095211 A1* | 4/2010 | Kenvin | G11B 27/034 715/723 |
| 2010/0169786 A1* | 7/2010 | O'Brien | G06F 17/30817 715/738 |
| 2010/0306656 A1* | 12/2010 | Moloney | G06F 17/30781 715/723 |
| 2011/0026898 A1* | 2/2011 | Lussier | G11B 27/034 386/280 |
| 2011/0295658 A1* | 12/2011 | Bastos | G06F 17/30867 705/14.1 |
| 2012/0084435 A1* | 4/2012 | Vasa | G06F 17/30796 709/224 |
| 2012/0177256 A1* | 7/2012 | Keefe | G06F 19/322 382/115 |
| 2012/0251993 A1* | 10/2012 | Chidambaran | G09B 7/00 434/362 |
| 2012/0257876 A1* | 10/2012 | Gupta | G11B 27/034 386/285 |
| 2012/0308211 A1 | 12/2012 | Xu et al. | |
| 2012/0310665 A1 | 12/2012 | Xu et al. | |
| 2012/0310666 A1 | 12/2012 | Xu et al. | |
| 2013/0094697 A1* | 4/2013 | Adcock | G06F 17/30817 382/103 |
| 2013/0259446 A1* | 10/2013 | Sathish | G11B 27/10 386/278 |
| 2013/0343597 A1* | 12/2013 | Kocks | G06K 9/00718 382/100 |
| 2013/0343598 A1* | 12/2013 | Kocks | H04N 21/8405 382/100 |
| 2014/0006042 A1* | 1/2014 | Keefe | G06F 19/363 705/2 |
| 2014/0129959 A1* | 5/2014 | Battles | G06F 3/0484 715/751 |
| 2014/0186004 A1* | 7/2014 | Hamer | G11B 27/034 386/223 |
| 2014/0244309 A1* | 8/2014 | Francois | G06F 19/322 705/3 |
| 2014/0267563 A1* | 9/2014 | Baca | H04N 21/4307 348/14.08 |
| 2014/0270700 A1* | 9/2014 | Dhanasarnsombat | G11B 27/102 386/241 |
| 2014/0349750 A1* | 11/2014 | Thompson | A63F 13/12 463/31 |
| 2015/0134365 A1* | 5/2015 | Keefe | G06F 19/321 705/3 |
| 2015/0310347 A1* | 10/2015 | Mukherji | H04L 67/10 706/51 |

* cited by examiner

COMPUTER-BASED SYSTEM AND METHOD FOR CREATING CUSTOMIZED MEDICAL VIDEO INFORMATION USING CROWD SOURCING

TECHNICAL FIELD

The present disclosure relates to a computer-based system and method for automatically creating customized medical video information using crowd sourcing. A crowd is used to identify segments of known medically-related videos relevant to a specific medical condition or topic. Comprehension of crowd members is tested before and after segment selection to assess educational effectiveness of the selected segments.

BACKGROUND

It is known to create a unique video for a patient that provides medical information specific to the patient. The creation of the video can include a combination of stock video, created personalized segments, and input created by a user, such as a health-care provider. Stock video is obtained from pre-existing video databases, such as YOU­TUBE® or WEBMD®. However, videos in pre-existing databases are not properly focused with respect to specific medical conditions or topics necessary to meet a patient's needs.

Typically, videos in pre-existing databases include information regarding multiple medical conditions. For example, a diabetes video can consist of both Type I and Type II information. For a Type II diabetes patient, the Type I information is irrelevant. Further, such a video may also include information regarding related medical conditions. For example, a diabetes video may include information regarding renal failure or obesity. If videos in pre-existing databases are limited to a specific medical condition, the videos often include a great deal of information not applicable to a patient. For example, information regarding a female patient or a juvenile patient may not be relevant to an older male patient. If a video including unrelated medical conditions or irrelevant information regarding a relevant medical condition is used for the stock video, the patient's time is wasted in viewing the unrelated segments, the patient may elect to skip the video, or the patient may fail to notice or appreciate relevant and important information "buried" in the video.

Pre-existing video databases can be searched, for example, with keywords or other metadata, to identify and time tag potentially relevant segments of the database. However, such searching fails to account for a patient's perspective and fails to provide any indication of how effective the tagged segments will be at conveying information to patients.

SUMMARY

According to aspects illustrated herein, there is provided a computer-based method for creating customized medical information, including: storing, in at least one memory element of at least one computer, computer readable instructions; and executing, using at least one processor for the at least one computer, the computer readable instructions to: select at least a portion of a first video containing information regarding a medical condition; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the second at least one SUI device a respective response from each viewer in the plurality of viewers, each respective response identifying at least one respective fourth segment of the third video deemed relevant to the medical condition by said each viewer or deemed enjoyable to view by said each viewer; create a fourth video including at least a portion of the respective fourth segments; and store, in the at least one memory element, the fourth video for inclusion in a video presentation regarding the medical condition.

According to aspects illustrated herein, there is provided a computer-based method for creating customized medical information, including: storing, in at least one memory element of at least one computer, computer readable instructions; and executing, using at least one processor for the at least one computer, the computer readable instructions to: select at least a portion of a first video containing information regarding a medical condition; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the at least one second SUI device a respective response from each viewer in the plurality of viewers, each respective response identifying a respective fourth segment of the third video deemed relevant to the medical condition by said each viewer or deemed enjoyable to view by said each viewer; test comprehension of the plurality of viewers with respect to the third video; assign a respective first ranking to each respective fourth segment in the third video according to a respective level of tested comprehension for said each viewer; create a fourth video, including only at least a portion of respective fourth segments having respective first rankings greater than a first threshold value; and store, in the at least one memory element, the fourth video for inclusion in a video presentation regarding the medical condition.

According to aspects illustrated herein, there is provided a computer-based method for creating customized medical information, including: storing, in at least one memory element of at least one computer, computer readable instructions; and executing, using at least one processor for the at least one computer, the computer readable instructions to: select at least a portion of a first video; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the at least one second SUI device a respective response from each viewer in the plurality of viewers, each respective response identifying a respective fourth segment of the third video deemed relevant to the medical condition by said each viewer or deemed enjoyable to view by said each viewer; identify respective first and second ranges of frames, from the plurality of frames, at the beginning and end, respectively, of each respective fourth segment in the third video; use video and audio processing techniques to identify respective beginning and end frames for each respective beginning and end range, respectively; create a plurality of fifth segments, each fifth segment beginning with a respective beginning frame and ending with a respective end frame; create a fourth video including at least a portion of the plurality of fifth segments; and store, in the at least one memory element, the fourth video for inclusion in a video presentation regarding the medical condition.

According to aspects illustrated herein, there is provided a computer-based method for creating customized medical information, including: storing, in at least one memory element of at least one computer, computer readable instructions; and executing, using at least one processor for the at least one computer, the computer readable instructions to: select at least a portion of a first video containing information regarding a medical condition; create a second video including a first plurality of segments from the first video; transmit for display, on at least one first sensory user interface (SUI) device, the second video for viewing by a plurality of viewers; receive from the at least one first SUI device a respective response from each viewer in the plurality of viewers, each respective response identifying a respective segment from the first plurality of segments deemed relevant to the medical condition by said each viewer or deemed enjoyable to view by said each viewer; create a third video including at least a portion of the respective segments from the first plurality of segments; transmit for display, on at least one second SUI device, the third video for viewing by qualified medical personnel; receive input from the qualified medical personnel; based on the input from the qualified medical personnel confirming suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the third video, a fourth video by at least including the first or second segment or deleting the third segment; store, in the at least one memory element, the fourth video for inclusion in a video presentation regarding the medical condition.

According to aspects illustrated herein, there is provided a computer-based apparatus for creating customized medical information, including at least one computer including: at least one memory element arranged to store computer readable instructions; and at least one processor arranged to execute the computer readable instructions to: select at least a portion of a first video containing information regarding a medical condition; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the second at least one SUI device a respective response from each viewer in the plurality of viewers, each respective response identifying at least one respective fourth segment of the third video deemed relevant to the medical condition by said each viewer or deemed enjoyable to view by said each viewer; create a fourth video including at least a portion of the respective fourth segments; and store, in the at least one memory element, the fourth video for inclusion in a video presentation regarding the medical condition.

According to aspects illustrated herein, there is provided a computer-based apparatus for creating customized medical information, including at least one memory element arranged to store computer readable instructions and at least one processor arranged to execute the computer readable instructions to: select at least a portion of a first video containing information regarding a medical condition; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the at least one second SUI device a respective response from each viewer in the plurality of viewers, each respective response identifying a respective fourth segment of the third video deemed relevant to the medical condition by said each viewer or deemed enjoyable to view by said each viewer; test comprehension of the plurality of viewers with respect to the third video; assign a respective first ranking to each respective fourth segment in the third video according to a respective level of tested comprehension for said each viewer; create a fourth video, including only at least a portion of respective fourth segments having respective first rankings greater than a first threshold value; and store, in the at least one memory element, the fourth video for inclusion in a video presentation regarding the medical condition.

According to aspects illustrated herein, there is provided a computer-based apparatus for creating customized medical information, including at least one memory element arranged to store computer readable instructions and at least one processor arranged to execute the computer readable instructions to: select at least a portion of a first video; create a second video including a plurality of segments from the first video; transmit for display, on at least one first sensory user interface (SUI) device, the second video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the second video, a third video by at least including the first or second segment or deleting the third segment; transmit for display, on at least one second SUI device and for viewing by a plurality of viewers, the third video; receive from the at least one second SUI device a respective response from each viewer in the plurality of viewers, each respective response identifying a respective fourth segment of the third video deemed relevant to the medical condition by said each viewer or deemed enjoyable to view by said each viewer; identify respective first and second ranges of frames, from the plurality of frames, at the beginning and end, respectively, of each respective fourth segment in the third video; use video and audio processing techniques to identify respective beginning and end frames for each respective beginning and end range, respectively; create a plurality of fifth segments, each fifth segment beginning with a respective beginning frame and ending with a respective end frame; create a fourth video including at least a portion of the plurality of fifth segments; and store, in the at least one memory element, the fourth video for inclusion in a video presentation regarding the medical condition.

According to aspects illustrated herein, there is provided a computer-based apparatus for creating customized medical information, including at least one memory element arranged to store computer readable instructions and at least one processor arranged to execute the computer readable instructions to: select at least a portion of a first video containing information regarding a medical condition; create a second video including a first plurality of segments from the first video; transmit for display, on at least one first sensory user interface (SUI) device, the second video for viewing by a plurality of viewers; receive from the at least one first SUI device a respective response from each viewer in the plurality of viewers, each respective response identifying a respective segment from the first plurality of segments deemed relevant to the medical condition by said each viewer or deemed enjoyable to view by said each viewer; create a third video including at least a portion of the respective segments from the first plurality of segments; transmit for display, on at least one second SUI device, the third video for viewing by qualified medical personnel; receive input from the qualified medical personnel; based on the input from the qualified medical personnel confirm suitability of a first segment from the first plurality of segments with respect conveying information regarding the medical condition or modify a second segment from the first plurality of segments to better convey information regarding the medical condition or identify a third segment from the first plurality of segments as being unsuitable for conveying information regarding the medical condition; create, from the third video, a fourth video by at least including the first or second segment or deleting the third segment; store, in the at least one memory element, the fourth video for inclusion in a video presentation regarding the medical condition.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Moreover, although any methods, devices or materials similar or equivalent to those described herein can be used in the practice or testing of these embodiments, some embodiments of methods, devices, and materials are now described.

Figure 1:
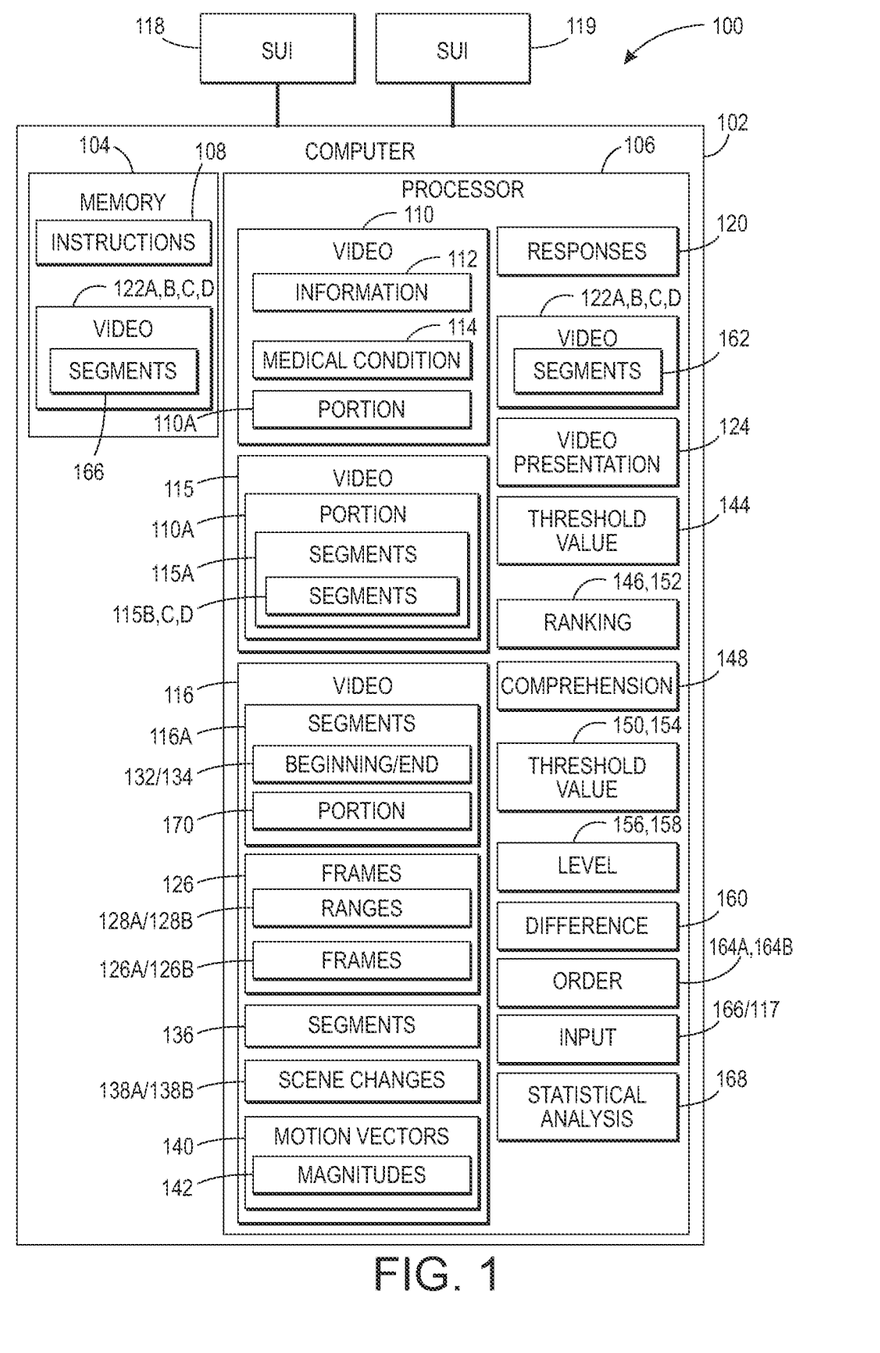
FIG. 1 is a schematic block diagram of a computer-based apparatus for presenting customized medical information.

FIG. 1 is a schematic block diagram of computer-based apparatus 100 for presenting customized medical information. Apparatus 100 includes at least one computer 102 with at least one memory element 104, and at least one processor 106. The memory element is configured to store computer readable instructions 108. Processor 106 is configured to execute the computer readable instructions to: select portion 110A of video 110 including information 112 regarding medical condition, or medical topic, 114; create video 115 including portion 110A and segments 115A from video 110; transmit for display, on at least one sensory user interface (SUI) device 118 (hereinafter referred to as SUI device 118) video 115 for viewing by qualified medical personnel; and receive input 117 from the qualified medical personnel. Processor 106 is configured to execute the computer readable instructions to, based on input 117, execute some or all of: confirming suitability of at least one segment 115B with respect conveying information regarding the medical condition; modifying segment 115C to better convey information regarding the medical condition; or identify segment 115D as being unsuitable for conveying information regarding the medical condition. Processor 106 is configured to execute the computer readable instructions to create, from video 115, video 116 including segments 116A obtained from segments 115A. Segments 116A are formed from segments 115A by at least including segment(s) 115B or 115C in segments 116A or deleting segment(s) 115D from segments 115A. Thus, to ensure that incorrect or inaccurate data is excluded from the video presentation, the medical personnel evaluate video 115 and segments 115A to eliminate inaccurate or inapplicable segments, to approve appropriate segments, and to modify, as necessary, segments to make the segments more accurate and applicable. This evaluation from medical personnel thus eliminates incorrect or inaccurate data which could result in patient actions contraindicated for their condition and medical liability exposure.

By "sensory user interface (SUI)" we mean an interface between a user and a computer system. For example, a SUI is a type of user interface that allows users to interact with electronic devices through graphical icons and visual indicators such as secondary notation, as well as text-based interfaces, typed command labels or text navigation. It should be understood that any type of sensory interface, such as auditory, tactile, or olfactory also can be used to interact with the electronic devices. By "SUI device" we mean computer hardware used to implement an interface between a user and a computer system, including, but not limited to a mouse, a keyboard, a touch screen, a monitor, motion recognition systems, audio recognition systems, and any sensory interface device or system known in the art.

Processor 106 is configured to execute the computer readable instructions to: transmit for display, on at least one SUI device 119 (hereinafter referred to as SUI device 119), video 116 for viewing by a plurality of viewers (a crowd); receive from SUI device 119 respective response 120 from each viewer in the plurality of viewers. Hereinafter it should be understood that "processor 106 is configured to" has the same meaning as "processor 106 is configured to execute the computer readable instructions to." Hereinafter, the terms "medical condition" and "medical topic" are used interchangeably. Each response 120 identifies at least one respective segment 116A of video 116 deemed relevant to medical condition 114 by the viewer or deemed enjoyable to view by the viewer. In an example embodiment, the processor is configured to perform a statistical analysis of video 110 and select 110A according to the statistical analysis.

Processor 106 is configured to create video 122A including segments 116A and store video 122A in memory element 104 for inclusion in video presentation 124 regarding medical condition 114.

In an example embodiment, video 122A includes frames 126 and processor 106 is configured to: identify respective ranges of frames 128A and 128B, from frames 126, at beginning and end 132 and 134, respectively, of each segment 116A in video 122A; use video and audio processing techniques to identify respective beginning and end frames 126A and 126B for each respective range 128A and 128B; create segments 136, each segment 136 beginning with a respective beginning frame 126A and ending with a respective end frame 126B; create video 122B including segments 136; and store video 122B in memory element 104 for inclusion in video presentation 124.

In an example embodiment, using video and audio processing techniques to identify respective beginning and ending frames includes: identifying respective scene changes 138A and 138V including respective beginning and ending frames 126A and 126B, or identifying respective motion vectors 140, having respective magnitudes 142 below threshold value 144, in respective beginning and ending frames 126A and 126B.

In an example embodiment, processor 106 is configured to test comprehension of the plurality of viewers with respect to content of video 122A or 122B, and assign respective ranking 146 to each respective segment 116A in video 122A or 122B according to respective level of tested comprehension 148 for each respective segment 116A.

In an example embodiment, processor 106 is configured to create video 122C, including only segments 116A having rankings 146 greater than threshold value 150, and store video 122C in memory element 104 for inclusion in video presentation 124. In an example embodiment, processor 106 is configured to assign respective ranking 152 to each segment 116A according to how many viewers in the plurality of viewers selected the segment 116A as being relevant or enjoyable; create video 122D, including only segments 116A having rankings 152 greater than threshold value 154; and store video 122D in memory element 104 for inclusion in video presentation 124.

In an example embodiment, testing comprehension of the plurality of viewers includes determining respective first level of knowledge 156 of said each viewer in the plurality of viewers with respect to medical condition 114 prior to said each viewer viewing video 122A or 122B, and determining respective level of knowledge 158 of each viewer in the plurality of viewers with respect to medical condition 114 after each viewer has viewed video 122A or 122B. In an example embodiment, assigning rankings 146 includes comparing levels of knowledge 156 and 158. In an example embodiment, processor 106 is configured to increase ranking 146 as difference 160 between levels of knowledge 156 and 158 increases.

In an example embodiment, video 122A or 122B includes video segments 162, and testing comprehension of the plurality of viewers includes: presenting, on SUI device 118, video segments 162 in order 164A to one viewer from the plurality of viewers and in order 164B to a different viewer from the plurality of viewers; or presenting respective video segments 162 only to respective separate portions of the plurality of viewers.

In an example embodiment, processor 106 is configured to receive input 166 from qualified medical personnel regarding accuracy of segments 116A with respect to medical condition 114, and remove or modify respective segments 116A according to the input.

In an example embodiment, processor 106 is configured to: perform statistical analysis 168 of segments 116A; select, according to statistical analysis 168, at least portion 170 of segments 116A; and create video 122A, including portion 170. Statistical analysis 168 can be any statistical analysis known in the art. In an example embodiment, statistical analysis 168 includes using a mean or median analysis to identify member segments 116A for portion 170.

In an example embodiment, portion 110A includes all of video 110.

Figure 2:
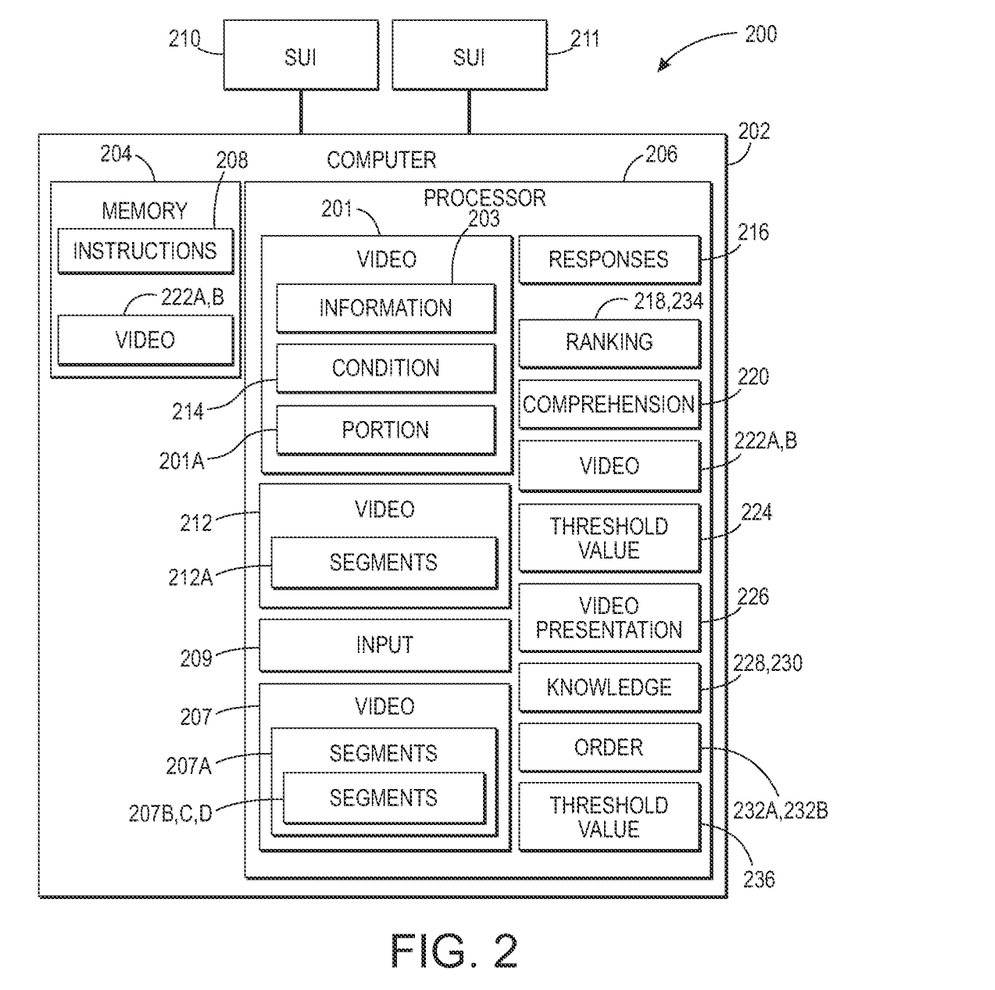
FIG. 2 is a schematic block diagram of a computer-based apparatus for presenting customized medical information.

FIG. 2 is a schematic block diagram of computer-based apparatus 200 for presenting customized medical information. Apparatus 200 includes at least one computer 202 with at least one memory element 204, and at least one processor 206. The memory element is configured to store computer readable instructions 208. Processor 206 is configured to execute the computer readable instructions to: select portion 201A of video 201 including information 203 regarding medical condition, or medical topic 214; create video 207 including portion 207A and segments 207A from video 201; transmit for display, on at least SUI device 211 (hereinafter referred to as SUI device 211) video 201 for viewing by qualified medical personnel; and receive input 209 from the qualified medical personnel. Processor 206 is configured to execute the computer readable instructions to, based on input 209, execute some or all of: confirming suitability of at least one segment 207B with respect conveying information regarding the medical condition; modifying segment 207C to better convey information regarding the medical condition; or identify segment 207D as being unsuitable for conveying information regarding the medical condition. Processor 206 is configured to execute the computer readable instructions to create, from video 207, video 212 including segments 212A obtained from segments 207A. Segments 212A are formed from segments 207A by at least including segment(s) 207B or 207C in segments 212A or deleting segment(s) 207D from segments 207A. Thus, to ensure that incorrect or inaccurate data is excluded from the video presentation, the medical personnel evaluate video 207 and segments 207A to eliminate inaccurate or inapplicable segments, to approve appropriate segments, and to modify, as necessary, segments to make the segments more accurate and applicable. This evaluation from medical personnel thus eliminates incorrect or inaccurate data which could result in patient actions contraindicated for their condition and medical liability exposure.

Processor 206 is configured to execute the computer readable instructions to: transmit for display, on at least one SUI device 210 (hereinafter referred to as SUI device 210), video 212, including segments 212A for viewing by a plurality of viewers; receive from SUI device 210 respective response 216 from each viewer in the plurality of viewers, each respective response 216 identifying at least one respective segment 212A deemed relevant to medical condition 214 by each viewer or deemed enjoyable to view by each viewer; and test comprehension of the plurality of viewers with respect to content of segments 212A. Processor 206 is configured to: assign respective ranking 218 to each segment 212A according to respective tested level of comprehension 220 for each segment 212A; create video 222A, including only segments 212A having ranking 218 greater than threshold value 224; and store video 222A in memory element 204 for inclusion in video presentation 226 regarding medical condition 214.

In an example embodiment, testing comprehension of the plurality of viewers includes determining respective level of knowledge 228 of each viewer in the plurality of viewers with respect to medical condition 214 prior to viewing video 222A, and for each segment 212A, determining respective level of knowledge 230 of each viewer with respect to medical condition 214 after each viewer has viewed video 222A. In an example embodiment, assigning ranking 218 includes comparing levels of knowledge 228 and 230.

In an example embodiment, processor 206 is configured to increase ranking 218 as a difference between levels of knowledge 228 and 230. That is, the degree of increase in level 230 is an indication of how effective the segment was in conveying information regarding condition 214.

In an example embodiment, testing comprehension of the plurality of viewers includes presenting, on SUI device 210, segments 212A in order 232A to one viewer from the plurality of viewers and in order 232B to another viewer from the plurality of viewers. In an example embodiment, testing comprehension of the plurality of viewers includes: presenting one segment 212A to only one portion of the plurality of viewers; and presenting another segment 212A only to another, different portion of the plurality of viewers.

In an example embodiment, processor 206 is configured to: assign respective second ranking 234 to each segment 212A according to how many viewers in the plurality of viewers selected the segment 212A as being relevant or enjoyable; create video 222B, including only segments 212A having respective rankings 238 greater than threshold value 236; and store video 222B in memory element 204 for inclusion in video presentation 226 regarding medical condition 214. It should be understood that the testing and ranking processes described above are applicable to video 222B.

Figure 3:
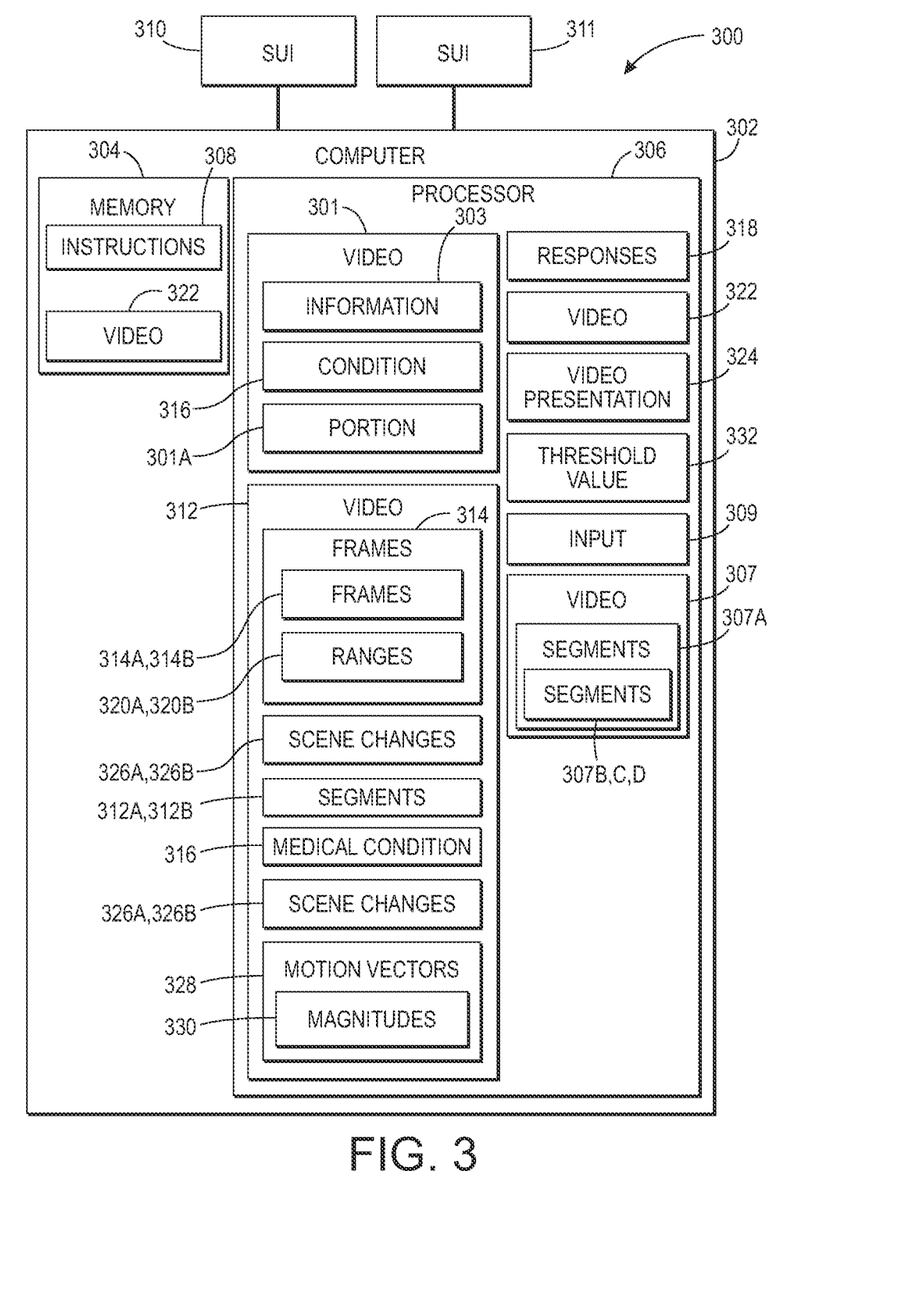
FIG. 3 is a schematic block diagram of a computer-based apparatus for presenting customized medical information; and, FIG. 4 is a schematic block diagram of a computer-based apparatus for presenting customized medical information.

FIG. 3 is a schematic block diagram of computer-based apparatus 300 for presenting customized medical information. Apparatus 300 includes at least one computer 302 with at least one memory element 304, and at least one processor 306. The memory element is configured to store computer readable instructions 308. Processor 306 is configured to execute the computer readable instructions to: select portion 301A of video 301 including information 303 regarding medical condition, or medical topic 316; create video 307 including portion 307A and segments 307A from video 301; transmit for display, on at least SUI device 311 (hereinafter referred to as SUI device 311) video 301 for viewing by qualified medical personnel; and receive input 309 from the qualified medical personnel. Processor 306 is configured to execute the computer readable instructions to, based on input 309, execute some or all of: confirming suitability of at least one segment 307B with respect conveying information regarding the medical condition; modifying segment 307C to better convey information regarding the medical condition; or identify segment 307D as being unsuitable for conveying information regarding the medical condition. Processor 306 is configured to execute the computer readable instructions to create, from video 307, video 312 including segments 312A obtained from segments 307A. Segments 312A are formed from segments 307A by at least including segment(s) 307B or 307C in segments 312A or deleting segment(s) 307D from segments 307A. Thus, to ensure that incorrect or inaccurate data is excluded from the video presentation, the medical personnel evaluate video 307 and segments 307A to eliminate inaccurate or inapplicable segments, to approve appropriate segments, and to modify, as necessary, segments to make the segments more accurate and applicable. This evaluation from medical personnel thus eliminates incorrect or inaccurate data which could result in patient actions contraindicated for their condition and medical liability exposure.

Processor 306 is configured to execute the computer readable instructions to: transmit for display, on at least one sensory user interface (SUI) device 310 (hereinafter referred to as SUI device 310), video 312, including frames 314 and segments 312A, for viewing by a plurality of viewers; receive from SUI device 310 respective responses 318 from each viewer in the plurality of viewers, each respective response 318 identifying at least one respective segment 312A of video 312 deemed relevant to medical condition 316 by the viewer or deemed enjoyable to view by the viewer; identify respective ranges 320A and 320B of frames 314 at the beginning and end, respectively, of each respective segment 312A. Hereinafter it should be understood that "processor 306 is configured to" has the same meaning as "processor 306 is configured to execute the computer readable instructions to."

In an example embodiment, processor 306 is configured to use video and audio processing techniques to identify respective beginning and end frames 314A and 314B for each respective range 320A and 320B; create segments 312B, each segment 312B beginning with a respective beginning frame 314A and ending with a respective end frame 314B; create video 322A including segments 312B; and store video 322A in memory element 304 for inclusion in video presentation 324 regarding the medical condition 316.

In an example embodiment, using video and audio processing techniques to identify respective beginning and end frames 314A and 314B includes: identifying respective scene changes 326A and 326B including respective beginning and ending frames 314A and 314B, respectively; or identifying respective motion vectors 328, having respective magnitudes 330 below threshold value 332, in respective beginning and ending frames 314A and 314B.

Figure 4:
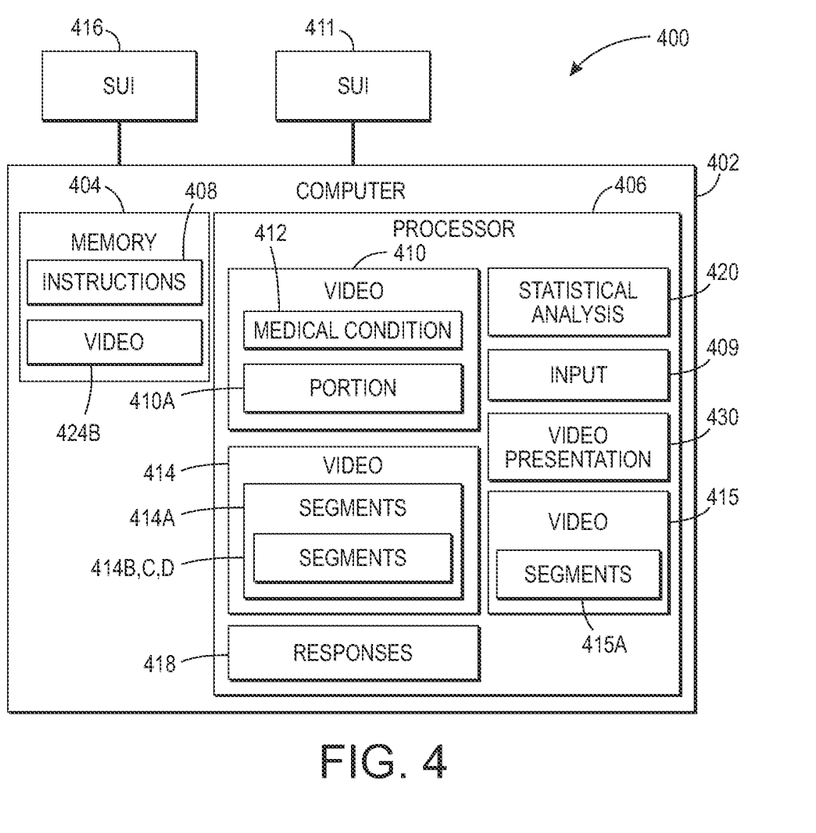

FIG. 4 is a schematic block diagram of computer-based apparatus 400 for presenting customized medical information. Apparatus 400 includes at least one computer 402 with at least one memory element 404, and at least one processor 406. The memory element is configured to store computer readable instructions 408. Processor 406 is configured to execute the computer readable instructions to: select portion 410A of video 410 including information regarding medical condition, or medical topic, 412; create video 414 including portion 412A; transmit for display, on at least one sensory user interface (SUI) device 416 (hereinafter referred to as SUI device 416), video 414 for viewing by a plurality of viewers; and receive from SUI device 416 respective response 418 from each viewer in the plurality of viewers, each respective response 418 identifying at least one respective segment 414A of video 414 deemed relevant to medical condition 412 by each viewer or deemed enjoyable to view by each viewer. Hereinafter it should be understood that "processor 406 is configured to" has the same meaning as "processor 406 is configured to execute the computer readable instructions to."

Processor 406 is configured to execute the computer readable instructions to: transmit for display, on at least SUI device 411 (hereinafter referred to as SUI device 411) video 414 for viewing by qualified medical personnel; and receive input 409 from the qualified medical personnel. Processor 406 is configured to execute the computer readable instructions to, based on input 409, execute some or all of: confirming suitability of at least one segment 414B with respect conveying information regarding the medical condition; modifying segment 414C to better convey information regarding the medical condition; or identify segment 414D as being unsuitable for conveying information regarding the medical condition. Processor 406 is configured to execute the computer readable instructions to create, from video 414, video 415 including segments 415A obtained from segments 414A and store video 415 in memory element 406 for inclusion in video presentation 430 regarding medical condition 414. Segments 415A are formed from segments 414A by at least including segment(s) 414B or 414C in segments 415A or deleting segment(s) 414D from segments 414A. Thus, to ensure that incorrect or inaccurate data is excluded from the video presentation, the medical personnel evaluate video 414 and segments 414A to eliminate inaccurate or inapplicable segments, to approve appropriate segments, and to modify, as necessary, segments to make the segments more accurate and applicable. This evaluation from medical personnel thus eliminates incorrect or inaccurate data which could result in patient actions contraindicated for their condition and medical liability exposure.

In an example embodiment, processor 406 is configured to: perform statistical analysis 420 of video 410; and select, according to statistical analysis 420, portion 410.

Statistical analysis 420 can be any statistical analysis known in the art. In an example embodiment, statistical analysis 420 includes generating a histogram or bell curve plotting how often each segment 414A is selected by the plurality of viewers. Then, selection of portion 422 is made according to the distribution of the histogram or bell curve, for example, the 50% of segments 414A closest to the peak of the bell curve is selected as portion 422.

The following discussion is directed to apparatus 100; however, it should be understood that the discussion is applicable to apparatus 200, 300, and 400 as well. Apparatus 100 advantageously uses crowd sourcing to identify portions of existing videos most applicable to a specific medical condition or topic. That is, the plurality of viewers described above is a crowd. By "crowd" we mean a pool of people. The pool can have any attribute known in the art, for example, professionals trained with respect to the specific medical condition or topic addressed in the videos being viewed, patients suffering from, directly impacted by, or interested in the medical condition or topic, an open pool such as one formed by an open internet invitation, or an employee pool similar to groups that are used for license plate reading from law enforcement camera images. The crowd sourcing and evaluation described for apparatus 100 (for example, selection of respective segments 116A) enables a level of screening and sorting not possible using known database search techniques.

By selection of the crowd, the review of existing videos can be even more tightly focused. For example, if the specific medical condition or topic of interest is renal failure related to Type I diabetes, the crowd can be selected to include a certain percentage of participants suffering from Type I diabetes and renal failure.

The following discussion is directed to apparatus 100; however, it should be understood that the discussion is applicable to apparatus 200 and 300 as well. Apparatus 100 also ensures the accuracy and suitability of video presentation 124 by the screening of video 110 by qualified medical personnel as part of the process of creating video 115 for viewing by the crowd.

In the example of apparatus 400, it is possible for a crowd to misapply a candidate segment to the particular medical topic or condition. In this case, incorrect data would be included in the video presentation, which could result in patient actions contraindicated for their condition and medical liability exposure. In an example embodiment, to assess the accuracy of candidate segments selected by the crowd and to address the problems noted above, the candidate segments selected by the crowd are reviewed for accuracy and applicability by qualified medical personnel. In an example embodiment, the qualified medical personnel only rate the accuracy of the information in the candidate segment, not the quality of the presentation for the candidate segments. Candidate segments that are not appropriate for the medical condition in question can be deleted or modified according to the input from the qualified medical personnel.

The following provides further detail regarding the operation of apparatus 100. In an example embodiment, to initiate the operation of apparatus 100, candidate videos regarding a specific medical condition or topic are selected from a database, such as the YOUTUBE® web site, using metadata, such as file name, comment fields, existing tagging, etc., or are selected directly from video content. The metadata can come with the original videos or can be generated based on the content of the video. For example, a bot can be used to do speech-to-text and context analysis, for example, POS and semantic analysis, to winnow down the candidate videos and subsequently create metadata for the candidate videos. Based on this initial analysis, a video portion, such as portion 110A of video 110, is selected and used to create the candidate video to be viewed by the crowd, for example, video 116.

The candidate video, such as video 116, is shown to crowd members with selected demographics and the viewers are asked to rate the candidate video for both content and presentation. There are various methods of forming a crowd. For instance, the crowd can be preselected according to targeted demographics, for example, persons suffering from the medical condition, or a large, more diverse crowd can be formed using random demographics and post select information from the crowd depending on the demographics needed for a particular application.

As an example, to rate the candidate video and select the most relevant segments of the candidate video, the video is presented to a crowd member through a web interface with a video player. The crowd member is asked to determine the relevancy of the candidate video with respect to a particular medical topic or condition and the viewing quality of the candidate video, for example, how enjoyable the candidate video was to view or how well the candidate video kept the viewer's attention. The crowd member marks the time segments, for example, segments 116A, of the video that were found useful for the explanation of the particular medical topic or condition and/or having high viewing quality. For example, for a candidate video directed to diabetes in general, the particular medical topic or condition could be Type II only, to the exclusion of Type I and viewing quality could be related to how well a segment held the crowd member's attention. In an example embodiment, the web interface enables the crowd member to mark a start and end of the video segment with a mouse click. The segments selected by the crowd member are candidates for use in the final video, such as video 122, to be included in a video presentation, such as presentation 124 regarding the particular medical topic or condition.

In an example embodiment, to provide a broad assessment of the validity of the selections made by the crowd member, the crowd member is given a short quiz to ensure that information in the candidate video has been correctly understood by the participant. For example, after selecting the segments of the candidate video, the crowd member is asked a series of questions regarding a basic overview of the particular medical topic or condition, for example, corresponding symptoms and treatments available based on content of the candidate video.

In an example embodiment, the selection of candidate segments from the candidate video for inclusion in the final video is partly determined by how effectively the segments educate the crowd members. Although crowd sourcing may identify candidate segments, there are two possible problems to be addressed: 1) it is possible that content of the candidate segments was misunderstood or did not adequately educate the crowd member (education effectiveness); and 2) accurate time marker placement (accurately defining the respective beginning and end points of the candidate segments).

Regarding educational effectiveness, while a candidate segment may present information clearly or in a pleasing fashion, the candidate segment may not convey sufficiently useful information. In an example embodiment, evaluating educational effectiveness and the potential for misinterpretation includes a rating strategy that relies on testing crowd members. In this scenario, crowd members are shown different candidate videos that contain similar material and are then tested on their comprehension of the respective information conveyed by the videos. Thus, the video segments with higher test scores (and thus greater educational effectiveness) are identified. Presentation aspects and knowledge gained from candidate segments are used to rate the appropriateness of the candidate segments for inclusion in personalized videos, such as presentation 124.

In an example embodiment, two methods for implementing the test paradigm described above are used. In one method, all members of the crowd are shown all the candidate videos being evaluated and are tested after viewing each candidate video. In order to eliminate learning bias in this method, the order in which the candidate videos are presented to each crowd member is either randomized or altered according to a particular rotation strategy. In an alternative implementation, the crowd is partitioned into a number of subdivisions equal to the number of candidate videos being evaluated and each subdivision views and is tested on only one of the candidate videos. Thus, the candidate segments scoring highest on quality of presentation and educational effectiveness are identified and used to create the final video.

The problem associated with crowd-sourced time marker placement is that the start and stop times for a candidate segment typically vary from crowd member to member and may not be precisely identified by a mouse click. Marking of start and stop times by the crowd may be accurate to within a second or two, but the use of the video will appear choppy if more accurate time markers are not determined. Advantageously, apparatus resolves the start and stop times of a video segment to greater accuracy so that inclusion of that segment in a larger video will appear natural. To refine the time markers for the beginning and end of candidate segments it is necessary to define what heuristically denotes the beginning and end of segments. Typically, in a video stream a segment is demarcated by either a change of scene or change of content. Several methods for detecting an abrupt change of scene in video are available in the literature (e.g., Z Li, J Jiang, G Xiao, H Fang, "*An Effective and Fast Scene Change Detection Algorithm for MPEG Compressed Videos,*" *Design* (2006)). These methods rely on finding either the poor estimation of a current frame using previous frames or the exclusive use of either forward or backward looking motion vectors in B frames. The above methods can be readily applied to apparatus 100 without modification. Additionally, since the time window of examination for a typical candidate segment is small (several seconds), the probability of false detection is relatively small.

The detection of a change of content is a more complex problem. In this instance, the video is relatively contiguous but the topics or information presented has changed. For example, a video of a doctor describing different types of diabetes may change topic from Type I to Type II diabetes in an instructional video. Determining the break point is done indirectly, for example, it is assumed to correspond to a quiescent segment of a video. Specifically, a quiescent segment is one in which little variation from frame to frame (that is, little movie "action") is coincident with pauses in dialog or music. This method is sufficient in the very small time window of uncertainty typically provided by the crowd sourcing results. The start and end time markers identified by the crowd are typically within a few seconds of the actual start and end times, and this technique is only used to provide smooth segment transition points within this small window. There is no concern that incorrect time marking using this scheme will result in inappropriate content given the extremely short time window of the time marker search.

In an example embodiment, periods of little "action" are found by analyzing the motion vectors of the frame in the compressed stream. Small magnitudes of the motion vectors and small residual errors correspond to a quasi-static frame, that is, a frame similar to the previous frame. Similarly, pauses in audio result in highly compressed audio segments, and these are easy to detect. The combination of little action and concurrent highly compressed audio provides indicators of quiescent segments that are excellent choices for start and end marker locations.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based method for creating customized medical information, comprising:
   storing, in at least one memory element of at least one computer, computer readable instructions; and,
   executing, using at least one processor for the at least one computer, the computer readable instructions to:
      select at least a portion of a first video containing information regarding a medical condition;
      create a second video including a plurality of segments from the first video;
      transmit for display, on at least one first sensory user interface (SUI) device, the second video for viewing by qualified medical personnel;
      receive input from the qualified medical personnel;
      based on the input from the qualified medical personnel:
         confirm suitability of a first segment from the plurality of segments with respect to conveying information regarding the medical condition; or,
         modify a second segment from the plurality of segments to better convey information regarding the medical condition; or,
         identify a third segment from the plurality of segments as being unsuitable for conveying information regarding the medical condition;
      create, from the second video, a third video by at least:
         including the first or second segment; or,
         deleting the third segment;
      transmit for display, on at least one second SUI device and for viewing by a plurality of viewers, the third video;
      receive from the second at least one SUI device a respective response from each viewer in the plurality of viewers, each respective response identifying at least one respective fourth segment of the third video deemed relevant to the medical condition by said each viewer or deemed enjoyable to view by said each viewer;
      create a fourth video including at least a portion of the respective fourth segments; and,
      store, in the at least one memory element, the fourth video for inclusion in a video presentation regarding the medical condition.

2. The computer-based method of claim 1, wherein the third video includes a plurality of frames, the method further comprising:
   executing, using the at least one processor, the computer readable instructions to:
      identify respective first and second ranges of frames, from the plurality of frames, at the beginning and end, respectively, of each respective fourth segment in the third video;
      use video and audio processing techniques to identify respective beginning and end frames for each respective beginning and end range, respectively;
      create a plurality of fifth segments, each fifth segment beginning with a respective beginning frame and ending with a respective end frame;
      create a fifth video including the plurality of fifth segments; and,
      store, in the at least one memory element, the fifth video for inclusion in the video presentation regarding the medical condition.

3. The computer-based method of claim 2, wherein using video and audio processing techniques to identify respective beginning and ending frames includes:
   identifying respective first and second scene changes including the respective beginning and ending frames, respectively; or,
   identifying respective motion vectors, having respective magnitudes below a threshold value, in the respective beginning and ending frames.

4. The computer-based method of claim 1, further comprising:
   executing, using the at least one processor, the computer readable instructions to:
      test comprehension of said each viewer with respect to the third video; and,
      assign a respective first ranking to each respective fourth segment in the third video according to a respective level of tested comprehension for said each viewer.

5. The computer-based method of claim 4, further comprising:
   executing, using the at least one processor, the computer readable instructions to:
      create a fifth video, including only respective fourth segments having respective first rankings greater than a first threshold value; and,
      store, in the at least one memory element, the fifth video for inclusion in the video presentation regarding the medical condition.

6. The computer-based method of claim 5, further comprising:
   executing, using the at least one processor, the computer readable instructions to:
      assign a respective second ranking to said each respective fourth segment according to how many viewers in the plurality of viewers selected said each respective fourth segment as being relevant or enjoyable;
      create a sixth video, including only respective fourth segments having second rankings greater than a second threshold value; and,
      store, in the at least one memory element, the sixth video for inclusion in the video presentation regarding the medical condition.

7. The computer-based method of claim 4, wherein:
   testing comprehension of the plurality of viewers includes determining a respective first and second levels of knowledge of said each viewer in the plurality of viewers with respect to the medical condition prior to and after, respectively, said each viewer viewing the third video; and,
   assigning the respective first ranking includes comparing the respective first and second levels of knowledge.

8. The computer-based method of claim 7, further comprising:
   executing, using the at least one processor, the computer readable instructions to increase the respective first ranking as a difference between the respective first and second levels of knowledge increases.

9. The computer-based method of claim 4, wherein testing comprehension of the plurality of viewers includes:
presenting the fourth segments in a first order to a first viewer from the plurality of viewers and in a second order to a second viewer from the plurality of viewers; or,
presenting one fourth segment only to at least one first viewer from the first plurality of viewers and presenting another fourth segment only to at least one second viewer from the first plurality of viewers, different from at least one first viewer.

10. The computer-based method of claim 1, further comprising:
executing, using the at least one processor, the computer readable instructions to:
perform a statistical analysis of the respective fourth segments; and,
select a portion of the respective fourth segments according to the statistical analysis, wherein:
creating the fourth video comprises including only the respective fourth segments selected by the statistical analysis.

11. The computer-based method of claim 1, wherein selecting at least a portion of the first video as a second video includes selecting an entirety of the first video as the second video.

12. A computer-based method for creating customized medical information, comprising:
storing, in at least one memory element of at least one computer, computer readable instructions; and,
executing, using at least one processor for the at least one computer, the computer readable instructions to:
select at least a portion of a first video containing information regarding a medical condition;
create a second video including a first plurality of segments from the first video;
transmit for display, on at least one first sensory user interface (SUI) device, the second video for viewing by qualified medical personnel;
receive input from the qualified medical personnel;
based on the input from the qualified medical personnel:
confirm suitability of a first segment from the first plurality of segments with respect to conveying information regarding the medical condition; or,
modify a second segment from the first plurality of segments to better convey information regarding the medical condition; or,
identify a third segment from the first plurality of segments as being unsuitable for conveying information regarding the medical condition;
create, from the second video, a third video by at least:
including the first or second segment; or,
deleting the third segment;
transmit for display, on at least one second SUI device and for viewing by a plurality of viewers, the third video;
receive from the at least one second SUI device a respective response from each viewer in the plurality of viewers, each respective response identifying a respective fourth segment of the third video deemed relevant to the medical condition by said each viewer or deemed enjoyable to view by said each viewer;
test comprehension of the plurality of viewers with respect to the third video;
assign a respective first ranking to each respective fourth segment in the third video according to a respective level of tested comprehension for said each viewer;
create a fourth video, including only at least a portion of respective fourth segments having respective first rankings greater than a first threshold value; and,
store, in the at least one memory element, the fourth video for inclusion in a video presentation regarding the medical condition.

13. The computer-based method of claim 12, wherein:
testing comprehension of the plurality of viewers includes determining a respective first and second levels of knowledge of said each viewer in the plurality of viewers with respect to the medical condition prior to and after, respectively, said each viewer viewing the third video; and,
assigning the respective first ranking includes comparing the respective first and second levels of knowledge.

14. The computer-based method of claim 12, further comprising:
executing, using the at least one processor, the computer readable instructions to increase the respective first ranking as a difference between the respective first and second levels of knowledge increases.

15. The computer-based method of claim 12, wherein testing comprehension of the plurality of viewers includes:
presenting the fourth segments in a first order to a first viewer from the plurality of viewers and in a second order to a second viewer from the plurality of viewers; or,
presenting one fourth segment only to at least one first viewer from the first plurality of viewers and presenting another fourth segment only to at least one second viewer from the first plurality of viewers, different from at least one first viewer.

16. The computer-based method of claim 12, further comprising:
executing, using the at least one processor, the computer readable instructions to:
assign a respective second ranking to said each respective fourth segment according to how many viewers in the plurality of viewers selected said each respective fourth segment as being relevant or enjoyable;
create a fifth video, including only respective fourth segments having respective second rankings greater than a second threshold value; and,
store, in the at least one memory element, the fifth video for inclusion in the video presentation regarding the medical condition.

17. A computer-based method for creating customized medical information, comprising:
storing, in at least one memory element of at least one computer, computer readable instructions; and,
executing, using at least one processor for the at least one computer, the computer readable instructions to:
select at least a portion of a first video;
create a second video including a first plurality of segments from the first video;
transmit for display, on at least one first sensory user interface (SUI) device, the second video for viewing by qualified medical personnel;
receive input from the qualified medical personnel;
based on the input from the qualified medical personnel:
confirm suitability of a first segment from the first plurality of segments with respect to conveying information regarding the medical condition; or, modify a second segment from the first plurality of segments to better convey information regarding the medical condition; or, identify a third segment from the first plurality of segments as being unsuitable for conveying information regarding the medical condition;

create, from the second video, a third video by at least:
including the first or second segment; or,
deleting the third segment;

transmit for display, on at least one second SUI device and for viewing by a plurality of viewers, the third video;

receive from the at least one second SUI device a respective response from each viewer in the plurality of viewers, each respective response identifying a respective fourth segment of the third video deemed relevant to the medical condition by said each viewer or deemed enjoyable to view by said each viewer;

identify respective first and second ranges of frames, from a plurality of frames, at the beginning and end, respectively, of each respective fourth segment in the third video;

use video and audio processing techniques to identify respective beginning and end frames for each respective beginning and end range, respectively;

create a plurality of fifth segments, each fifth segment beginning with a respective beginning frame and ending with a respective end frame;

create a fourth video including at least a portion of the plurality of fifth segments; and, store, in the at least one memory element, the fourth video for inclusion in a video presentation regarding the medical condition.

18. The computer-based method of claim 17, wherein using video and audio processing techniques to identify respective beginning and ending frames includes:

identifying respective first and second scene changes including the respective beginning and ending frames, respectively; or, identifying respective motion vectors, having respective magnitudes below a threshold value, in the respective beginning and ending frames.

19. A computer-based method for creating customized medical information, comprising:

storing, in at least one memory element of at least one computer, computer readable instructions; and, executing, using at least one processor for the at least one computer, the computer readable instructions to:

select at least a portion of a first video containing information regarding a medical condition;

create a second video including a first plurality of segments from the first video;

transmit for display, on at least one first sensory user interface (SUI) device, the second video for viewing by a plurality of viewers;

receive from the at least one first SUI device a respective response from each viewer in the plurality of viewers, each respective response identifying a respective segment from the first plurality of segments deemed relevant to the medical condition by said each viewer or deemed enjoyable to view by said each viewer;

create a third video including at least a portion of the respective segments from the first plurality of segments;

transmit for display, on at least one second SUI device, the third video for viewing by qualified medical personnel;

receive input from the qualified medical personnel;

based on the input from the qualified medical personnel:

confirm suitability of a first segment from the first plurality of segments with respect to conveying information regarding the medical condition; or, modify a second segment from the first plurality of segments to better convey information regarding the medical condition; or, identify a third segment from the first plurality of segments as being unsuitable for conveying information regarding the medical condition;

create, from the third video, a fourth video by at least:
including the first or second segment; or,
deleting the third segment;

store, in the at least one memory element, the fourth video for inclusion in a video presentation regarding the medical condition.

* * * * *